(12) United States Patent
Na et al.

(10) Patent No.: US 12,519,150 B2
(45) Date of Patent: Jan. 6, 2026

(54) METHOD FOR RECOVERING ACTIVE METAL OF LITHIUM SECONDARY BATTERY

(71) Applicant: SK INNOVATION CO., LTD., Seoul (KR)

(72) Inventors: Ji Ye Na, Daejeon (KR); Min Su Koo, Daejeon (KR); Yeon Hwa La, Daejeon (KR); Sung Real Son, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 975 days.

(21) Appl. No.: 17/066,734

(22) Filed: Oct. 9, 2020

(65) Prior Publication Data

US 2021/0028515 A1 Jan. 28, 2021

Related U.S. Application Data

(63) Continuation of application No. PCT/KR2019/004194, filed on Apr. 9, 2019.

(30) Foreign Application Priority Data

Apr. 9, 2018 (KR) .................. 10-2018-0040935

(51) Int. Cl.
*H01M 4/00* (2006.01)
*H01M 4/131* (2010.01)
(Continued)

(52) U.S. Cl.
CPC ........... *H01M 10/54* (2013.01); *H01M 4/131* (2013.01); *H01M 4/364* (2013.01); *H01M 4/621* (2013.01); *H01M 10/0525* (2013.01)

(58) Field of Classification Search
CPC ...... H01M 10/54; H01M 4/131; H01M 4/364; H01M 4/621; H01M 10/0525;
(Continued)

(56) References Cited

U.S. PATENT DOCUMENTS

| 6,447,669 B1 * | 9/2002 | Lain | H01M 6/52 |
| | | | 429/49 |
| 8,882,007 B1 * | 11/2014 | Smith | H01M 10/54 |
| | | | 241/23 |

(Continued)

FOREIGN PATENT DOCUMENTS

| CN | 106834703 A | 6/2017 |
| CN | 107324392 A | 11/2017 |

(Continued)

OTHER PUBLICATIONS

Machine translation of JP-2011094228-A, obtained Aug. 2023 (Year: 2011).*

(Continued)

*Primary Examiner* — Nicholas P D'Aniello
(74) *Attorney, Agent, or Firm* — The PL Law Group, PLLC

(57) ABSTRACT

A method for recovering an active metal of a lithium secondary battery according to an embodiment of the present application whereby a used lithium-containing mixture is prepared, and the used lithium-containing mixture is treated with a hydrogen reduction to prepare a preliminary precursor mixture. The preliminary precursor mixture is washed with water to generate a lithium precursor including lithium hydroxide. Lithium hydroxide can be obtained by the washing treatment with high purity.

10 Claims, 1 Drawing Sheet

(51) Int. Cl.
*H01M 4/36* (2006.01)
*H01M 4/62* (2006.01)
*H01M 10/0525* (2010.01)
*H01M 10/54* (2006.01)

(58) Field of Classification Search
CPC ......... Y02P 10/20; C22B 7/002; C22B 7/005; Y02E 60/10; C01D 15/02; C01D 1/04; Y02W 30/84
See application file for complete search history.

(56) References Cited

U.S. PATENT DOCUMENTS

| 2015/0052739 A1* | 2/2015 | Deb .................... H01M 4/525 |
| | | 29/623.5 |
| 2019/0233297 A1* | 8/2019 | Kim ....................... C01D 15/08 |

FOREIGN PATENT DOCUMENTS

| JP | 10-255862 A | 9/1998 |
| JP | 2004-011010 A | 1/2004 |
| JP | 2011-94228 A | 5/2011 |
| JP | 2012-229481 A | 11/2012 |
| JP | 2015-203131 A | 11/2015 |
| KR | 10-2012-0094619 A | 8/2012 |
| KR | 10-2015-0002963 A | 1/2015 |
| KR | 10-2015-0094412 A | 8/2015 |
| KR | 10-1682217 B1 | 12/2016 |
| KR | 10-1828168 B1 | 2/2018 |
| KR | 10-1897134 B1 | 9/2018 |

OTHER PUBLICATIONS

Machine translation of JP-2012229481-A, obtained Aug. 2023 (Year: 2012).*
Machine translation of JP-2004011010-A, obtained Aug. 2023 (Year: 2004).*
Office action issued on May 9, 2023 from Japan Intellectual Property Office in a counterpart Japanese Patent Application No. 2020-555015 (all the cited references are listed in this IDS.) (English translation is also submitted herewith.).
International Search Report for PCT/KR2019/004194 mailed on Aug. 1, 2019.
Office action issued on Oct. 26, 2023 from China Patent Office in a counterpart China Patent Application No. 201980024248.2 (English translation is also submitted herewith.).
Zhao Peng-fei et al., "Research of spent Li-ion battery recycling process", Chinese Battery Industry, 2011, vol. 15, No. 6 (English Abstract is included in the first page.).

* cited by examiner

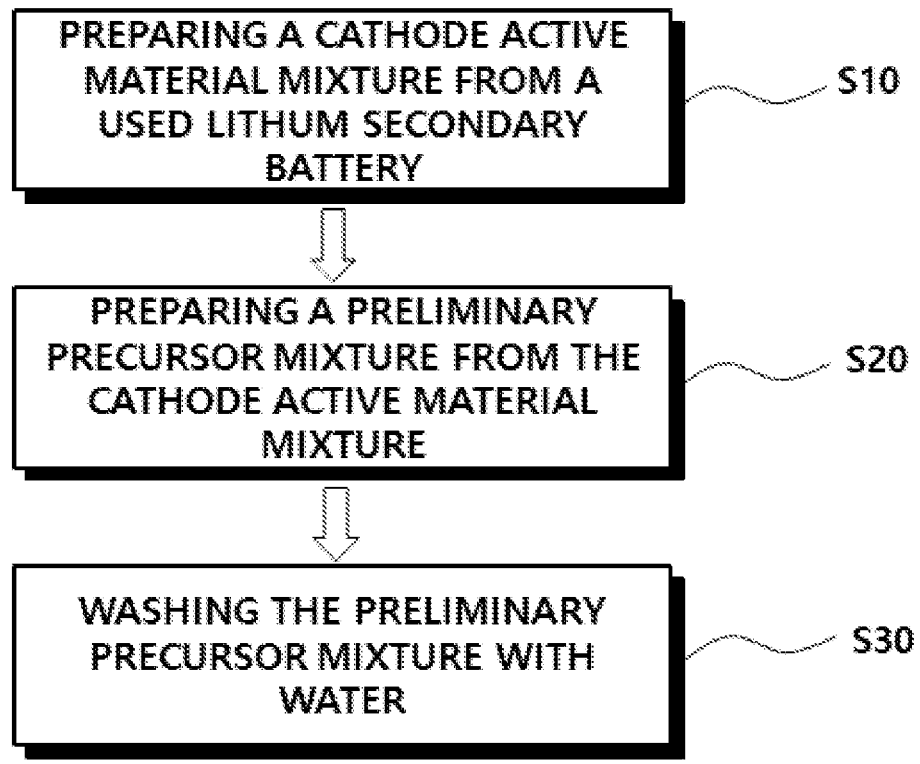

METHOD FOR RECOVERING ACTIVE METAL OF LITHIUM SECONDARY BATTERY

CROSS REFERENCE TO RELATED APPLICATIONS AND CLAIM OF PRIORITY

The present application is a continuation application to International Application No. PCT/KR2019/004194 with an International Filing Date of Apr. 9, 2019, which claims the benefit of Korean Patent Application No. 10-2018-0040935 filed on Apr. 9, 2018 at the Korean Intellectual Property Office, the disclosures of which are incorporated by reference herein in their entirety.

BACKGROUND

1. Field

The present invention relates to a method for recovering an active metal of a lithium secondary battery. More particularly, the present invention relates to a method of recovering a precursor of an active metal from a lithium secondary battery.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

The lithium secondary battery may include an electrode assembly including a cathode, an anode and a separation layer (a separator), and an electrolyte immersing the electrode assembly. The lithium secondary battery may further include an outer case having, e.g., a pouch shape for accommodating the electrode assembly and the electrolyte.

A lithium metal oxide may be used as an active material for a cathode of a lithium secondary battery. The lithium metal oxide may further include a transition metal such as nickel, cobalt, manganese, etc.

The lithium metal oxide as the cathode active material may be prepared by reacting a lithium precursor and a nickel-cobalt-manganese (NCM) precursor containing nickel, cobalt and manganese.

As the above-described valuable metals are used in the cathode active material, more than 20% of a manufacturing cost is required to prepare a cathode material. Additionally, as environmental issues have been recently highlighted, a recycling method of the cathode active material is being researched. For the recycle of the cathode active material, regeneration of the lithium precursor with high efficiency and purity may be needed.

SUMMARY

According to an aspect of the present invention, there is provided a method of recovering an active metal from a lithium secondary battery with high efficiency and high purity.

In a method for recovering an active metal of a lithium secondary battery according to exemplary embodiments of the present invention, a used lithium-containing mixture is prepared. The used lithium-containing mixture is treated with a hydrogen reduction to prepare a preliminary precursor mixture. The preliminary precursor mixture is washed with water to generate a lithium precursor including lithium hydroxide.

In exemplary embodiments, in the preparing the used lithium-containing mixture, a cathode active material mixture may be prepared from a used lithium secondary battery.

In exemplary embodiments, in the preparing the cathode active material mixture, a cathode including a cathode current collector, a cathode active material, a binder and a conductive agent may be separated from the used lithium secondary battery. The cathode current collector may be removed by grinding the separated cathode or treating the separated cathode with an organic solvent.

In exemplary embodiments, the hydrogen reduction may be performed through a fluidized bed reactor utilizing a hydrogen gas.

In exemplary embodiments, the preliminary precursor mixture may include a preliminary lithium precursor and a transition metal-containing product.

In exemplary embodiments, the preliminary lithium precursor may include lithium hydroxide, lithium oxide and lithium carbonate.

In exemplary embodiments, lithium oxide and lithium carbonate included in the preliminary lithium precursor may be removed by the washing with water.

In exemplary embodiments, an aqueous lithium hydroxide solution may be generated and the transition metal-containing product may be precipitated by the washing with water.

In exemplary embodiments, the precipitated transition metal-containing product may be treated with an acidic solution to regenerate a transition metal precursor.

In exemplary embodiments, the washing with water may be performed in a carbon dioxide ($CO_2$)-free atmosphere.

In exemplary embodiments, the washing with water may include purging water with nitrogen before reacting water with the preliminary precursor mixture.

In exemplary embodiments, the lithium precursor may consist of lithium hydroxide.

According to the above-described exemplary embodiments, a preliminary lithium precursor may be obtained by a dry treatment of a cathode achieved from a used lithium secondary battery. The preliminary lithium precursor may be washed with water to obtain a lithium precursor in the form of lithium hydroxide with high purity.

The lithium precursor may be substantially completely converted to lithium hydroxide through the washing with water, and thus the lithium precursor from which lithium carbonate ($Li_2CO_3$) may be substantially excluded may be prepared.

In some embodiments, the dry treatment may be performed through a fluidized bed reactor using hydrogen reduction, and lithium carbonate may be additionally prevented from being included in the preliminary lithium precursor. Additionally, a separation of transition metals other than lithium may also be promoted, thereby further improving a selectivity of the lithium precursor.

BRIEF DESCRIPTION OF THE DRAWING

FIGURE is a schematic flow diagram for describing a method of recovering an active metal in accordance with exemplary embodiments.

DETAILED DESCRIPTION

According to exemplary embodiments of the present invention, there is provided a method of recovering an active metal that includes a lithium precursor capable of being re-used to prepare a cathode active material from a used lithium secondary battery.

Hereinafter, embodiments of the present invention will be described in detail with reference to the accompanying drawing. However, the embodiments are provided as exemplary examples, and the spirit of the present invention are not limited to those specific embodiments.

The term "precursor" used herein broadly refers to a compound containing a specific metal to provide the specific metal included in an electrode active material.

FIGURE is a schematic flow diagram for describing a method of recovering an active metal.

Referring to FIGURE, a used lithium-containing mixture may be prepared. The used lithium-containing mixture may include a lithium-containing compound obtained or regenerated from an electrical device or a chemical device. Non-limiting examples of the used lithium-containing mixture may include various lithium-containing compounds such as lithium oxide, lithium carbonate, lithium hydroxide, etc.

In exemplary embodiments, the used lithium-containing mixture may include a cathode active material mixture obtained from a used lithium secondary battery (e.g., in an operation of S10).

The lithium secondary battery may include an electrode assembly including a cathode, an anode and a separation layer interposed between the cathode and the anode. The cathode may include a cathode current collector and a cathode active material layer coated thereon, and the anode may include an anode current collector and an anode active material layer coated thereon.

For example, a cathode active material included in the cathode active material layer may include an oxide containing lithium and a transition metal.

In some embodiments, the cathode active material may include a compound represented by Chemical Formula 1 below.

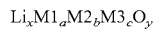

[Chemical Formula 1]

In Chemical Formula 1, M1, M2 and M3 may be transition metals selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, $0<a+b+c\leq1$.

In some embodiments, the cathode active material may be an NCM-based lithium oxide containing nickel, cobalt, and manganese. The NCM-based lithium oxide as the cathode active material may be prepared by reacting a lithium precursor and an NCM precursor (e.g., NCM oxide) with each other through, e.g., a co-precipitation reaction.

However, embodiments of the present invention may be commonly applied to a cathode material containing lithium as well as a cathode material containing the NCM-based lithium oxide.

The lithium precursor may include lithium hydroxide (LiOH), lithium oxide ($Li_2O$) or lithium carbonate ($Li_2CO_3$). Lithium hydroxide may be advantageous as the lithium precursor in consideration of charge/discharge properties, life-span properties, high temperature stability, etc., of a lithium secondary battery. For example, lithium carbonate may cause a precipitation reaction on the separation layer, thereby reducing life-span stability.

Accordingly, according to embodiments of the present invention, a method of regenerating lithium hydroxide as the lithium precursor with high selectivity may be provided.

For example, the cathode may be separated from the used lithium secondary battery to recover the used cathode. As described above, the cathode may include the cathode current collector (e.g., aluminum (Al)) and the cathode active material layer, and the cathode active material layer may include a conductive agent and a binder together with the cathode active material.

The conductive agent may include, e.g., a carbon-based material such as graphite, carbon black, graphene, carbon nanotube, etc. The binder may include a resin material such as vinylidene fluoride-hexafluoropropylene copolymer (PVDF-co-HFP), polyvinylidene fluoride (PVDF), polyacrylonitrile, polymethyl methacrylate, etc.

A cathode active material mixture may be prepared from the recovered cathode. In some embodiments, the cathode active material mixture may be prepared in a powder form through a physical method such as a grinding treatment. As described above, the cathode active material mixture may include a powder of the lithium-transition metal oxide, and may include, e.g., a powder of the NCM-based lithium oxide (e.g., $Li(NCM)O_2$).

In some embodiments, the recovered cathode may be thermally treated before the grinding treatment. Accordingly, detachment of the cathode current collector may be promoted during the grinding treatment, and the binder and the conductive agent may be at least partially removed. For example, a temperature of the thermal treatment may be from about 100 to 500° C. or from about 350 to 450° C.

In some embodiments, the cathode active material mixture may be obtained after immersing the recovered cathode in an organic solvent. For example, the recovered cathode may be immersed in the organic solvent to separate and remove the cathode current collector, and the cathode active material may be selectively extracted through a centrifugation.

Cathode current collector components such as aluminum may be substantially completely separated and removed by the above-described processes, and the cathode active material mixture from which carbon-based components derived from the conductive agent and the binder are removed or reduced may be obtained.

A preliminary precursor mixture may be prepared from the cathode active material mixture (e.g., in an operation of S20). In exemplary embodiments, the cathode active material mixture may be subjected to a hydrogen reduction to prepare the preliminary precursor mixture.

In some embodiments, the hydrogen reduction may be performed through a fluidized bed reactor. For example, the cathode active material mixture may be introduced into the fluidized bed reactor and a hydrogen gas may be injected from a bottom of the fluidized bed reactor.

A cyclone may be formed from the bottom of the fluidized bed reactor by the hydrogen gas while contacting the cathode active material mixture to create the preliminary precursor mixture.

In some embodiments, a carrier gas may be mixed together with the hydrogen gas and may be injected from the bottom of the fluidized bed reactor. Accordingly, a fluidized bed may promote a reaction by promoting a gas-solid mixing, and a reaction layer of the preliminary precursor mixture may be easily formed in the fluidized bed reactor. The carrier gas may include, e.g., an inert gas such as nitrogen ($N_2$) or argon (Ar).

The preliminary precursor mixture may include a product of the hydrogen reduction of the lithium-transition metal oxide contained in the cathode active material mixture. When the NCM-based lithium oxide is used as the lithium-transition metal oxide, the preliminary precursor mixture may include a preliminary lithium precursor and a transition metal-containing product.

The preliminary lithium precursor may include lithium hydroxide, lithium oxide and/or lithium carbonate. In exemplary embodiments, the preliminary lithium precursor may be obtained through the hydrogen reduction, so that a mixing amount of lithium carbonate may be reduced.

The transition metal-containing product may include Ni, Co, NiO, CoO, MnO, etc.

The hydrogen reduction may be performed at a temperature from about 400 to 700° C. or from about 450 to 550° C.

In exemplary embodiments, the preliminary precursor mixture may be collected and then washed with water (e.g., in an operation of S30).

The preliminary lithium precursor may be obtained as a lithium precursor substantially consisting of lithium hydroxide by the washing treatment. The preliminary lithium precursor in the form of lithium hydroxide (LiOH) may be substantially dissolved in water by the washing treatment to obtain an aqueous lithium hydroxide solution. Lithium hydroxide dissolved in water may be recovered again through a drying process or the like to obtain the lithium precursor essentially consisting of lithium hydroxide.

In an embodiment, the preliminary lithium precursor in the form of lithium oxide and lithium carbonate may be substantially removed through the washing treatment. In an embodiment, the preliminary lithium precursor particles in the form of lithium oxide and lithium carbonate may be at least partially converted to lithium hydroxide through the washing treatment.

As described above, a high-purity lithium precursor consisting of desired lithium hydroxide may be generated.

The transition metal-containing product contained in the preliminary precursor mixture may be precipitated without being dissolved or reacted in water by the washing treatment. Accordingly, the transition metal-containing product may be separated by a filtration treatment, and the lithium precursor including high-purity lithium hydroxide may be obtained.

In some embodiments, the washing treatment may be performed under a condition from which carbon dioxide ($CO_2$) is excluded. For example, the washing treatment may be performed in a $CO_2$-free atmosphere (e.g., an air atmosphere from which $CO_2$ is removed), so that regeneration of lithium carbonate may be prevented.

In an embodiment, water provided during the washing treatment may be purged using a $CO_2$-deficient gas (e.g., a nitrogen purging) to create the $CO_2$-free atmosphere.

In some embodiments, the precipitated and separated transition metal-containing product may be treated with an acidic solution to form precursors in the form of acid salts of each transition metal. In an embodiment, sulfuric acid may be used as the acidic solution. In this case, $NiSO_4$, $MnSO_4$, and $CoSO_4$ may be recovered as the transition metal precursor.

As described above, the preliminary precursor mixture generated by the hydrogen reduction may be washed with water to obtain the lithium precursor substantially consisting of lithium hydroxide. Accordingly, the cathode active material having improved capacity and life-span may be obtained while preventing generation of byproducts such as a lithium precursor in the form of lithium carbonate, etc.

Hereinafter, exemplary embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example 1 kg of a cathode material separated from a used lithium secondary battery was thermally treated at 450° C., and cut into small units and grinded by milling. The grinded cathode material was filtered through a sieve having 80 μm mesh size to remove a cathode current collector component (Al) and carbon-based impurities to obtain a cathode active material mixture.

10 g of the cathode active material mixture was charged to a column-type hydrogen reduction reactor, and 20% hydrogen gas was injected and reacted at 450° C. for 2 hours to obtain a preliminary precursor mixture.

The preliminary precursor mixture was reacted with 100 ml of nitrogen-purged water, and then filtered through a filter paper to obtain a lithium-containing supernatant by a centrifugation. Components were analyzed for each of the lithium-containing supernatant, and the obtained lithium precursor and precipitated salt by an inductively coupled plasma (ICP) analysis, and the results are shown in Table 1 below.

TABLE 1

|  | Li | Co | Mn | Ni | Al |
|---|---|---|---|---|---|
| lithium-containing supernatant (ppm) | 3320 | — | — | — | — |
| precipitated salt (wt %) | 1.5 | 15.3 | 13.5 | 22.2 | 0.18 |

Referring to Table 1, a lithium component was substantially only detected in the lithium-containing supernatant, and carbon-based components were not detected. Thus, the lithium-containing supernatant was predicted to substantially consist of lithium hydroxide. Additionally, a lithium loss to the precipitated salt was prevented to obtain the lithium precursor with high yield and high purity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recovering an active metal of a lithium secondary battery, the method comprising:

preparing a used lithium-containing mixture;

treating the used lithium-containing mixture with a hydrogen reduction to prepare a preliminary precursor mixture; and washing the preliminary precursor mixture with water to generate a lithium precursor including lithium hydroxide, wherein the preliminary precursor mixture includes a preliminary lithium precursor and a transition metal-containing product, and the preliminary lithium precursor includes lithium hydroxide, wherein the washing with water is performed in a carbon dioxide ($CO_2$)-free atmosphere by purging with a $CO_2$-deficient gas-so that generation of lithium carbonate is prevented from the lithium hydroxide in the preliminary lithium precursor.

2. The method of claim 1, wherein the preparing the used lithium-containing mixture comprises preparing a cathode active material mixture from a used lithium secondary battery.

3. The method of claim 2, wherein the preparing the cathode active material mixture comprises:

separating a cathode including a cathode current collector, a cathode active material, a binder and a conductive agent from the used lithium secondary battery; and removing the cathode current collector by grinding the separated cathode or treating the separated cathode with an organic solvent.

4. The method of claim 1, wherein the hydrogen reduction is performed through a fluidized bed reactor utilizing a hydrogen gas.

5. The method of claim 1, wherein the preliminary lithium precursor further includes lithium oxide and lithium carbonate.

6. The method of claim 5, wherein lithium oxide and lithium carbonate included in the preliminary lithium precursor are removed by the washing with water.

7. The method of claim 6, wherein an aqueous lithium hydroxide solution is generated and the transition metal-containing product is precipitated by the washing with water.

8. The method of claim 7, further comprising treating the precipitated transition metal-containing product with an acidic solution to regenerate a transition metal precursor.

9. The method of claim 1, wherein the $CO_2$-deficient gas is nitrogen.

10. The method of claim 1, wherein the lithium precursor consists of lithium hydroxide.

\* \* \* \* \*